United States Patent
Lacroix

(10) Patent No.: US 10,348,982 B1
(45) Date of Patent: Jul. 9, 2019

(54) HIGH FRAME RATE FOCAL-PLANE ARRAY AND READOUT INTEGRATED CIRCUIT

(71) Applicant: BAE SYSTEMS Information and Electronic Systems Integration Inc., Nashua, NH (US)

(72) Inventor: Daniel P. Lacroix, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/004,068

(22) Filed: Jun. 8, 2018

(51) Int. Cl.
*G01J 5/20* (2006.01)
*H04N 5/33* (2006.01)
*G01J 5/22* (2006.01)
*G01J 5/00* (2006.01)

(52) U.S. Cl.
CPC ............... *H04N 5/33* (2013.01); *G01J 5/20* (2013.01); *G01J 5/22* (2013.01); *G01J 2005/0077* (2013.01); *G01J 2005/202* (2013.01)

(58) Field of Classification Search
CPC ...... G01J 5/20; G01J 5/00; G01J 5/22; H04N 5/33
See application file for complete search history.

(56) References Cited

U.S. PATENT DOCUMENTS

| | | | |
|---|---|---|---|
| 2009/0152664 A1* | 6/2009 | Klem | H01L 27/14603 257/440 |
| 2012/0196150 A1 | 8/2012 | Tsuchiya et al. | |
| 2015/0334315 A1* | 11/2015 | Teich | H04N 5/2257 348/164 |
| 2016/0057369 A1* | 2/2016 | Wolfe | H04N 5/33 348/322 |
| 2018/0336667 A1* | 11/2018 | Clark, II | G06T 5/006 |

OTHER PUBLICATIONS

Han, Myungsoo, et al, 'A Fabrication and Characteristics of Microbolometer Detectors using VOx/ZnO/VOx Multilayer Processing', Proceedings of SPIE—The International Society for Optical Engineering, vol. 9070. Jun. 24, 2014. 8 pages.

(Continued)

*Primary Examiner* — Yara B Green
(74) *Attorney, Agent, or Firm* — Finch & Maloney PLLC

(57) ABSTRACT

A focal-plane array includes: an array of thermal sensors arranged in at least 120 rows and at least 160 columns, the thermal sensors being divided among three or more subarrays; and bias circuitry to concurrently pulse bias the thermal sensors of one of the rows of each of the subarrays, and to sequentially bias the rows of each of the subarrays at a rate of at least 40,000 rows per second. A readout integrated circuit includes: a sensing area to physically and electrically connect to the array of thermal sensors and includes row circuitry to perform the concurrent pulse biasing and the sequential biasing, and column circuitry to concurrently measure analog signals from the pulse-biased thermal sensors; and conversion circuitry to convert the measured analog signals to corresponding digital signals. In some embodiments, the thermal sensors are operated without cooling. In some embodiments, the rows are interleaved between the subarrays.

20 Claims, 10 Drawing Sheets

(56) References Cited

OTHER PUBLICATIONS

Wang, Bin et al, "Nanostructured vanadium oxide thin film with high TCR at room temperature for microbolometer", Infrared Physics & Technology, vol. 57, Mar. 2013; pp. 8-13.
Endoh, Tsutomu et al, "Uncooled infrared detector with 12μm pixel pitch video graphics array", Proceedings of SPIE—The International Society for Optical Engineering, vol. 8704, Jun. 11, 2013. 12 pages.
"Sales Disclosure", 1 pages.

* cited by examiner

FIG. 3

Signal Processing Pipeline
300

| Line Time Operation | N | N+1 | N+2 | N+3 |
|---|---|---|---|---|
| Load Offset DAC Latches | 10 | 11 | 12 | 13 |
| Signal Integration | 9 | 10 | 11 | 12 |
| A/D conversion | 8 | 9 | 10 | 11 |
| Output Data MUX | 7 | 8 | 9 | 10 |

Method of Thermal Imaging 1000

FIG. 10

Start

↓

Divide image processing of array of uncooled infrared detectors arranged in at least 240 rows and at least 320 columns into simultaneous image processing of four or more subarrays having interleaved rows of the infrared detectors that together make up the array
1010

↓

Simultaneously load offset current values for infrared detectors of one row of each subarray
1020

↓

Simultaneously pulse bias infrared detectors of the one row of each subarray to generate analog signals while simultaneously generating offset currents from loaded offset current values to normalize analog signals into corresponding normalized signals and while simultaneous loading offset current values for infrared detectors of subsequent row of each subarray
1030

↓

Simultaneously convert normalized signals of the one row of each subarray to corresponding digital signals while simultaneously pulse biasing infrared detectors of the subsequent row of each subarray
1040

↓

Sequentially bias rows of each subarray at rate of at least 40,000 rows per second
1050

↓

End

HIGH FRAME RATE FOCAL-PLANE ARRAY AND READOUT INTEGRATED CIRCUIT

FIELD OF THE DISCLOSURE

This disclosure relates to a high frame rate focal-plane array (FPA) and readout integrated circuit (ROIC).

BACKGROUND

A thermal image can be obtained by sensing infrared (IR) radiation, such as with an array of bolometers or microbolometers, or with some other thermal detecting focal-plane array (FPA) structure or thermal imager. A bolometer detects particular bands of electromagnetic radiation (such as IR) by exposing a thermally isolated material that absorbs these bands to a source of the radiation and measuring the temperature increase in the absorbing material. For example, a resistive thermometer can be connected to two ends of the material, and current can be driven through the material to measure the resistance, which changes with the temperature of the material. An array of such bolometers can produce an image from these measured bands of radiation. An FPA is an array of detectors on which incoming radiation is focused, together with circuitry, such as a readout integrated circuit (ROIC), to drive the array and process the sensor readings.

SUMMARY

As used throughout, IR radiation refers primarily to mid-wavelength IR and long-wavelength IR radiation, such as between 3 micrometer (μm) and 15 μm wavelength IR radiation, collectively known as thermal IR or just thermal for short. A bolometer array or microbolometer array (or other thermal imaging device) can capture thermal images in frames, each frame being a complete exposure and measurement of each of the thermal detectors in the array. However, there are a number of non-trivial performance issues with obtaining such thermal images with a high frame rate, such as 100 hertz (Hz) or higher.

BRIEF DESCRIPTION OF THE DRAWINGS

Features of embodiments of the claimed subject matter will become apparent as the following Detailed Description proceeds, and upon reference to the Drawings, wherein like numerals depict like parts.

FIG. 3 is a timeline diagram of an example signal processing pipeline of the FPA of FIG. 1, according to an embodiment of the present disclosure.

FIG. 10 is a flow diagram of an example method of thermal imaging, according to an embodiment of the present disclosure.

Figure 1:
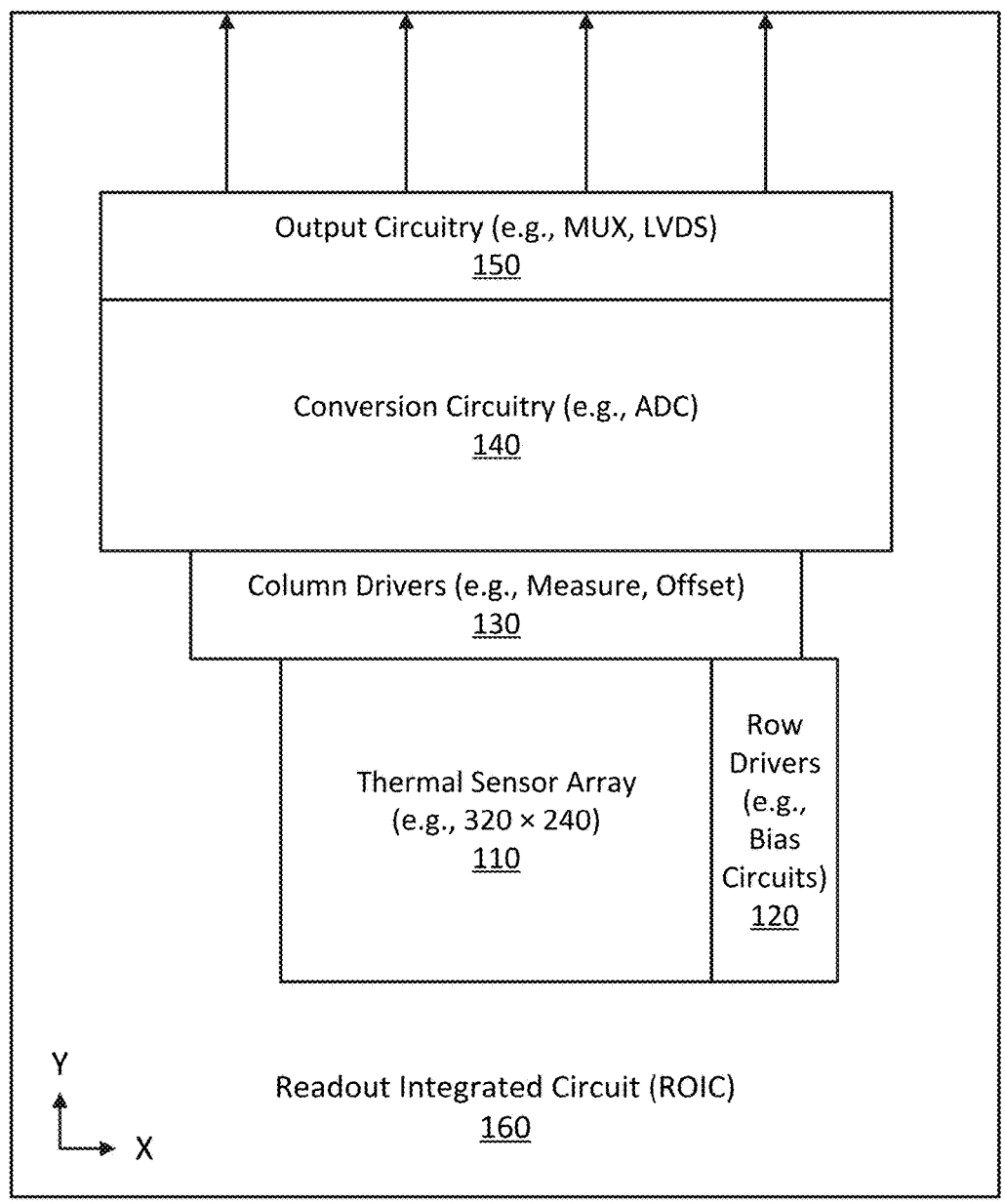
FIG. 1 is a. plan view of an example focal-plane array (FPA), according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

In various embodiments, a high frame rate focal-plane array (FPA) and readout integrated circuit (ROIC) structure is provided. In some such embodiments, the FPA includes an array of uncooled thermal detectors, such as thermal detectors that are configured to operate in ambient temperatures without cooling. In some such embodiments, the thermal detectors are bolometers or microbolometers that are sensitive to IR radiation, such as thermal IR radiation. In some embodiments, the ROIC is a specialized integrated circuit configured to physically and electrically connect to the thermal detector array, with row and column circuitry to operate the array. In some such embodiments, the ROIC processes the sensed data from the detector array into digital image data and outputs that for use by other processing components (such as other processors or integrated circuits). In various embodiments, an uncooled high frame rate IR focal-plane array (FPA) and readout integrated circuit (ROIC) device are provided. For example, the device (e.g., an FPA) can achieve frame rates of 500 hertz (Hz) or 1000 Hz for Video Graphics Array (VGA, or 640 columns by 480 rows) resolution.

To accomplish such high frame rates, in various embodiments, numerous (such as four or eight) rows of IR sensors of a microbolometer array are biased in an overlapping or concurrent fashion. Here, overlapping or concurrent can denote, for example, as a group, at the same time, in parallel, simultaneously, or other such concurrent operation. The biasing period is referred to herein as a biasing cycle (or just cycle). In various embodiments, the rows of IR sensors are divided into three or more subsets (such as four or eight), with the IR sensors of one of rows of each of the subsets being biased at the same time or in some other concurrent fashion. For ease of description, this overlapping processing is generally referred to as concurrent throughout, but can be performed differently in different embodiments. For instance, four rows (one from each subset) may be processed simultaneously as a group in one embodiment, from one group to the next, but in another embodiment the processing may be staggered so that, at any given time, four rows (from different subsets) are being concurrently processed, but with staggered and partially overlapping biasing cycles.

In addition to the concurrent biasing, corresponding multiple path (such as four-way or eight-way) column circuitry (e.g., part of the ROIC) is provided to concurrently measure and process analog IR signals (e.g., electric currents) from the biased sensors. As before, concurrently is intended to cover situations such as simultaneously, or as a group, or in parallel, or overlapping, or at the same time (or some other notion of overlapping exclusivity of different instances of a multiple resource). For example, in one cycle (or one biasing cycle), the four or eight rows are biased as a group, and corresponding analog IR signals from the biased sensors are measured. In the next cycle, the measured analog IR signals are converted as a group (e.g., simultaneously or other concurrent operation), such as with analog-to-digital converters (ADCs), to corresponding digital IR signals. In the following cycle, the digital IR signals are output from the ROIC.

In various embodiments, specially-designed IR sensing pixels (such as for thermal imaging) are provided and that have a small thermal time constant, such as one to two milliseconds (ms), to achieve high frame rates, such as 500 Hz to 1000 Hz for VGA size sensing systems. In various embodiments, the IR sensor array is divided into four or eight interleaved subarrays, each of which is driven (or processed) at a rate of at least 40,000 rows per second. This provides for high speed IR imaging for situations such as fast-moving objects, fast-moving cameras (or other sensing platforms), fast-moving hostile situations (such as for military purposes), and fast response time scenarios (e.g., where the imaging data is driving other high-speed applications such as countermeasures), to name a few. Other uses and embodiments will be appreciated in light of this disclosure.

General Overview

As mentioned above, there are a number of non-trivial performance issues with obtaining thermal images at a high frame rate, such as VGA frame rates of 500 hertz (Hz) or 1000 Hz. For example, thermal or IR sensors (such as bolometers) that are arranged in an array (as with a microbolometer array) are biased once each frame to detect the incoming IR radiation (or IR flux). However, long bias times (to produce accurate sensor readings) can lead to correspondingly long frames and thus, low frame rates. On the other hand, short bias times can require high biasing voltages, which can quickly heat the sensors and require a long cooldown period before re-biasing, which again leads to low frame rates. In addition, even if the sensors could be driven (e.g., powered and measured) fast enough on the front end (e.g., data acquisition), the back end (e.g., data conversion, such as analog-to-digital conversion or ADC) infrastructure on the ROIC may not be able to keep up with the image signal data rate produced from the high frame rate.

Accordingly, and in various embodiments, in an array of IR detectors connected to a ROIC, several rows (such as a group of three or more rows) of the IR detectors are biased simultaneously or concurrently, such as during a biasing cycle or biasing instance. This reduces the number of bias instances or bias cycles per frame. In some embodiments, the IR detectors are pixels for forming thermal images. In some embodiments, the detector array includes at least 120 rows and 160 columns (160×120) of IR detectors. In various embodiments, the array can be divided into three of more subarrays of the IR detectors, with the rows of IR detectors being processed (e.g., biased) sequentially within each subarray, and processed concurrently between subarrays. For example, during a biasing instance or biasing cycle (or just cycle for short), one row from each subarray can be concurrently biased.

To achieve the high frame rates, in various embodiments, the number of bias cycles in at least 40,000 per second. For example, the number of rows being sequentially biased per subarray is at least 40,000 per second. The frame rate can be defined as the number of bias cycles per second divided by the number of rows in the thermal detector array, and times the number of subarrays (e.g., concurrent processings). For example, 40,000 bias cycles per second, 480 rows of IR detectors, and four subarrays that make up the detector array and that are concurrently processed (e.g., 4-way or 4-row), the frame rate is 40,000/480×4=333 Hz. Higher frame rates can be achieved, for example, by more bias cycles per second, or more subarrays being concurrently processed.

In some embodiments, such concurrent processing can include a pipelined approach performed in cycles (an example of which is shown in the signal processing pipeline 300 of FIG. 3). During each cycle of the pipeline, a different concurrent operation is performed for several rows of the detector array. There are at least two levels of concurrency being described here: within each operation (e.g., multiple rows being processed as a group for the same operation) and within each cycle (e.g., multiple operations being performed in parallel, each on a different group of rows). Further, there is some sequential processing taking place (e.g., operations for the same group of rows are performed sequentially across consecutive cycles).

In further detail, and in one or more embodiments using the pipelined technique, throughout the processing, IR radiation is focused on the detector array (e.g., through a lens or other camera optic). Example operations are performed sequentially in the pipeline for the same group of rows, and in parallel for different groups of rows. These operations can include: loading offset current values in one cycle for each IR detector in the three or more rows being processed; generating the offset currents (from the loaded offset current values), biasing (and measuring) the IR detectors, offsetting (or normalizing) the measured currents with the offset currents, and integrating the normalized currents in the next cycle, converting the integrated (analog) signals from the biased detectors to corresponding digital signals in the next cycle, and outputting the digital signals in the next cycle.

The offset currents can be used to adjust for (e.g., strip off, remove) portions of the measured current (such as the DC component and the component due to the heating of the IR detector during biasing) of the biasing as well as to normalize the resulting signals, e.g., to account for sensing differences between individual IR detectors, such as fixed pattern noise (FPN). For instance, the offset currents can be determined empirically for each focal-plane array (FPA) by subjecting the thermal detector array to fixed, evenly distributed IR radiation (such as no IR radiation or some known baseline level of IR radiation) and comparing the detected IR radiation levels measured at each pixel (IR detector). The offset currents can be generated, for example, by an offset digital-to-analog converter (DAC), such as an offset DAC for each column and for each subarray or concurrent row being processed. For example, with 160 columns and four-way row concurrency (e.g., four subarrays), there would be 160×4=640 offset DACs, one for each IR detector being concurrently processed in the same operation. Likewise, for processing eight rows concurrently in the same operation (eight-way concurrency), there would be 160×8=1280 offset DACs. During the following the cycle, these offset DACs can be reused for the next groups of rows being concurrently processed in the pipeline.

The pulse biasing (or biasing cycle) of the IR detectors can include integrating the analog electrical signals (e.g., currents) from the IR detectors for the biasing time (e.g., one cycle or biasing cycle) while applying (e.g., subtracting) the offset currents to normalize the measured analog IR signals or currents being integrated. The converting of the sensed (and normalized analog) signals (e.g., integrated currents) can include using analog-to-digital converters (ADCs) to convert the corresponding analog IR signals to digital IR signals. For example, there can be one ADC per column per subarray being processed (e.g., the same as the number of offset DACs). The outputting of the digital IR signals can include using multiple serial channels on the ROIC, such as multiple low-voltage differential signaling (LVDS) channels, to output the digital signals from the ROIC.

In some embodiments, larger FPAs are used, such as FPAs including 320×240, 640×480, 1024×768, or 1920×1200 arrays of IR detectors, to name a few. In some embodiments, the detector arrays are divided into subarrays, with equal numbers of the array rows in the subarrays, and one row of each subarray being processed per cycle (e.g., per bias cycle, or unit of pipeline operation). In some such embodiments, the rows are interleaved between the subarrays (such as four subarrays, with every fourth row in the detector array being part of the same subarray). In some embodiments, the subarrays are concurrently or simultaneously processed at a higher bias cycle rate, such as 45,000, 50,000, or 60,000 bias cycles (rows per subarray) per second. In some embodiments, the IR detectors are designed to be operated at ambient temperatures (such as room temperature) without cooling. In some embodiments, the concurrent or simultaneous multi-row processing is pipelined, such as biasing one row from each subarray while loading offset current values for a subsequent (e.g., later) row from each subarray and while converting analog signals to digital signals for a previous row (such as an earlier row) from each subarray.

In some embodiments, the IR detectors are small, such as 12 micrometers (μm) or 17 μm on each side. In some such embodiments, the 12 μm or 17 μm (to quote the previous examples) refers to the pitch between pixels, such as the distance between corresponding sides of adjacent pixels (the actual pixels being a little smaller than 12 μm or 17 μm on a side. In some embodiments, the ROIC includes row and column circuitry sufficient to concurrently or simultaneously drive (e.g., power and measure) or process the multiple number of rows (e.g., three, four, six, or eight) per bias cycle.

For instance, the column circuitry can have, e.g., three, four, six, or eight parallel paths for each column. The replicated column circuitry can be used, for example, to measure the sensed analog IR signals (or currents) from each pixel while applying the corresponding offset currents to produce normalized currents, and integrating the normalized currents to produce normalized analog IR signals. Here, the term pixel can also refer to an IR detector or other IR sensor positioned at the corresponding row and column of the sensor array. The measuring of the pixels can be performed concurrently for the pixels (or IR detectors) in the, e.g., three, four, six, or eight rows being processed in parallel. In addition, different portions of the column circuitry can convert these normalized analog IR signals to corresponding digital IR signals (e.g., perform the analog-to-digital conversion) in the following cycle.

In some embodiments, the IR detecting material in each pixel has high IR sensitivity. For instance, each pixel may include vanadium oxide (e.g., vanadium dioxide, doped vanadium oxide) or some other IR detecting material. Regardless of the particular detector material used, in some embodiments, the temperature coefficient of resistance (TCR) of the detector material is at least 2.0%/° C. (such as 2.5%/° C., 3.0%/° C., or more).

In some embodiments, the thermal time constant for the pixels is designed to match the intended frame rate, such as one millisecond (ms) for 1000 Hz frame rate embodiments, two ms for 500 Hz frame rate embodiments, or four ms for 250 Hz frame rate embodiments. In some embodiments, the noise for the pixel sensing is kept small enough that the noise component does not dominate the normalized analog sensing signals.

In some embodiments, the ROIC includes a sensing area for physically connecting to the detector array, and a processing area outside the sensing area for driving the image processing (e.g., performing each of the operations in the pipeline). The sensing area includes row circuitry (such as row lines) for concurrently or simultaneously pulse biasing the IR detectors (e.g., bolometers) of three or more rows, and column circuitry (such as column lines) for concurrently or simultaneously measuring analog signals from the pulse biased detectors of the three or more rows. In some embodiments, the processing area has offset circuitry (e.g., offset DACs) to normalize the analog IR signals being measured from the IR detectors and conversion circuitry (e.g., ADCs) to convert the measured and normalized analog signals to corresponding digital signals. The processing area can also include output circuitry (e.g., LVDS channels) to output the digital signals from the ROIC.

In some embodiments, the processing area includes two processing areas on opposite sides of the sensing area. In some such embodiments, the offset circuitry, the conversion circuitry, and the output circuitry is replicated in each processing area. In some such embodiments, the circuitry in each processing area is processed by row, with one processing area for some (e.g., half) of the rows (e.g., the even rows), and another processing area for the other (e.g., other half) of the rows (e.g., the odd rows). In some such embodiments, the offset circuitry, conversion circuitry, and output circuitry are stacked (e.g., using one or two interconnect layers to duplicate the logic), to allow each conversion area to concurrently or simultaneously process two rows of pixels.

In other such embodiments, the offset circuitry, conversion circuitry, and output circuitry in each peripheral region are not stacked. Rather, the duplicated circuitry is arranged side-by-side, the peripheral region circuitry being roughly twice the width (e.g., twice the width of the sensing area) as in the stacked configuration. In some embodiments, both stacking and side-by-side arranging are done, allowing three or four sets of column circuitry per processing area. In some such configurations, eight rows of pixels are processed concurrently or simultaneously, four rows per processing area, using both the stacked (e.g., extra one or two interconnect layers) and side-by-side (e.g., twice the width) approaches.

Numerous other example embodiments and configurations will be apparent in light of this disclosure.

System Architecture

FIG. 1 is a. plan (X-Y) view of an example focal-plane array (FPA) 100, according to an embodiment of the present disclosure. Here, X, Y, and Z represent orthogonal dimensions (such as length, width, and height, with the X and Y dimensions being planar or horizontal dimensions and the Z dimension being the vertical dimension). The FPA 100 can be fabricated, for example, using integrated circuit techniques such as photolithography.

In the FPA 100, thermal sensor array 110 is physically and electrically connected to a readout integrated circuit (ROIC) 160, such as through a set of row lines and column lines in the ROIC 160 underneath the thermal sensor array 110. The ROIC includes row circuitry or row drivers 120 coupled to the row lines, column circuitry or column drivers 130 coupled to the column lines, conversion circuitry 140, and output circuitry 150. These lines and circuits that make up the ROIC 160 can be fabricated as part of an integrated circuit on a substrate. The FPA 100 (and more specifically, the array 110) can, in turn, be placed at the focal plane of a lens or camera system for performing thermal imaging. The FPA 100 can take IR images in frames (e.g., each frame representing one measurement per pixel or thermal sensor) and at a particular frame rate (e.g., number of frames per second, or Hz). In various embodiments, the frame rate is at least 100 Hz.

The thermal sensor array 110 includes an array of thermal sensors or pixels, such as an arrangement of 240 rows and 320 columns (320×240) of such sensors. The array size can vary between embodiments, for example being as small as 160×120 or as large as 1920×1200 (or greater). There is no minimum or maximum size of the array 110, subject to the design constraints needed to build or operate it for the intended uses and at the driving rates discussed herein. In addition, as used herein, rows and columns refer to the two dimensions of the array, but can be interchanged between embodiments (e.g., rows can be columns and vice versa in other embodiments). In addition, simple rearrangements of the pixels (e.g., different two-dimensional arrangements such as offset rows or columns, staggered rows or columns, non-rectangular shapes such as circles or other polygons, and the like) are also intended to be within the scope of the present disclosure. For ease of description, rectangular arrangements such as 320×240 and 640×480 will be discussed primarily, and extensions to other shapes and sizes will be apparent in light of the disclosure.

The thermal sensors are configured to sense IR radiation, such as light (or electromagnetic radiation) having wavelengths between 3 μm and 15 μm. In some embodiments, more specific bands of IR radiation are sensed, such as mid-wavelength IR (e.g., 3 μm to 8 μm) or long-wavelength IR (e.g., 8 μm to 15 μm). The pixels are arranged with a certain size or pitch, such as 12 μm or 17 μm. For example, the sensors can use an IR sensitive material such as vanadium oxide (e.g., $VO_2$ or $VO_x$ where X is some proportion other than two) or metal-doped vanadium oxide to detect incoming IR radiation that is focused on the thermal sensor array 110. The vanadium oxide (or other IR sensitive material) can cover some or most of the exposed surface area of the pixel.

Vanadium oxide is a conductive material that heats when exposed to IR radiation. The heating causes the resistance of the vanadium oxide to lower due to its thermal coefficient of resistance (TCR). For example, the TCR of vanadium oxide can be around 2%/° C. In some embodiments, the TCR of vanadium oxide can be improved through techniques such as metal doping. This can increase the TCR to values such as 2.5%/° C., or 3.0%/° C., or more (e.g., 3.3%/° C.). The increased TCR can improve the sensitivity and resolution of the thermal sensor. The TCR causes the measured resistance in the IR detector to decrease as the detector heats up (e.g., through absorbing IR radiation). This decrease in resistance can be measured, for example, using row drivers 120 and column drivers 130 to measure the increased current passing through the decreased resistance. Since the current is inversely proportional to the resistance, the measured current provides a way to measure the resistance, and thus the temperature change, in the thermal sensor. From this, the portion of the temperature change due to IR flux can be determined and thus, a value or values representing the IR radiation measured by the thermal sensor can be determined. The process can be repeated across the array 110 of thermal sensors (such as concurrently performing the process across rows of the thermal sensors) until every thermal sensor is measured.

In further detail, the rows of the thermal sensor array 110 are electrically connected to the row drivers 120 through row lines, such as one row driver and row line per row of pixels. Each row driver is configured to bias (such as concurrently or simultaneously pulse bias) the thermal sensors in its corresponding row. Biasing transmits a biasing current through a set of electrodes, such as a common low voltage source coupled to one side (e.g., one electrode) of each thermal sensor. The row drivers 120 are configured to concurrently or simultaneously pulse bias at least three rows at a time (such as three or four as illustrated in the FPA 100 of FIG. 1), which allows greater frame rates to be achieved than biasing only one or two rows at a time. In addition, the columns of the thermal sensor array 110 are electrically connected to the column drivers 130, such as one column driver per column of pixels per row being concurrently or simultaneously biased.

The column drivers 130 are configured to concurrently or simultaneously measure the thermal sensors of the at least three rows, such as by integrating and measuring the current from a separate high voltage source coupled to the other side of each thermal sensor. For example, each column driver can be coupled to one of the thermal sensors being biased, and measures the current transmitted through the thermal sensor during the biasing (or integration) period or cycle. The measured current represents an analog IR signal. The column drivers 130 (and conversion circuitry 140) are illustrated as being wider than the thermal sensor array 110 to represent the extra column-related circuitry needed to drive (e.g., power and measure, convert) three or four rows concurrently or simultaneously. Through a combination of stacking replicated components (e.g., on one or two extra interconnect layers in the integrated circuit structure) and placing replicated components side-by-side (extra width compared to the thermal sensor array 110), the logic to handle three- or four-way concurrent or simultaneous row processing can be included in the FPA 100.

To efficiently perform the concurrent or simultaneous row processing, and reduce or minimize the amount of column circuitry, each column driver can be connected to the thermal sensors of a subset of the rows in its column. These subsets can define subarrays of the array 110. For example, the concurrent or simultaneous row biasing can be four-way (four rows at a time), with the rows being four consecutive rows that are interleaved between subarrays. For instance, rows 1, 5, 9, . . . , can be one subarray and coupled to one set of column drivers (e.g., each column has one column driver coupled to all of the thermal sensors in rows 1, 5, 9, . . . , driving only one such thermal sensor at a time depending on the particular row being biased), rows 2, 6, 10, . . . , can be a second subarray and coupled to a second set of column drivers, rows 3, 7, 11, . . . , can be a third subarray and coupled to a third set of column drivers, and rows 4, 8, 12, . . . , can be a fourth subarray and coupled to a fourth set of column drivers. Each column driver can have a separate electrical line coupled to all of the thermal sensors in its column, but only measures the thermal sensor in the one particular row being biased at the time. However, the subarrays are processed concurrently (such as simultaneously), so four separate thermal sensors in each column are concurrently or simultaneously biased and measured in the same cycle, each to a different column driver.

The pulse biasing can introduce inaccuracies into the measured IR signal currents. For instance, the biasing itself can heat the IR sensors, causing further change in their resistances and that is not due to the incoming IR flux being measured. This heating, which is also referred to as bias heating when measuring the IR sensor, can be the dominant portion of the increased heat. Another source of inaccuracies can be the absolute readings of the IR sensors, which can vary dramatically from sensor to sensor due to factors such as normal fabrication variance (which increases significantly with smaller and thinner sensor design). To address inaccuracies such as these, offset currents can be generated for each IR sensor. For example, the array 110 of IR sensors can be calibrated using a target pattern having a known or fixed IR signature. From this calibration, corresponding offset currents can be determined that can be used to cancel the effects such as the DC component (e.g., normal current experienced at beginning of biasing an unheated IR sensor), the bias heating, and the variance between pixels during the pulse biasing and signal integration cycle.

Once determined, the offset currents can be stored as digital quantities (e.g., 8-bit offset current values) in the ROIC (e.g., one or more such values per pixel). For example, the values can be stored in a non-volatile memory on the ROIC, and the appropriate values loaded during the offset current value portion of the processing. In some embodiments, the digital quantities can be converted to corresponding offset currents using an offset digital-to-analog converter (offset DAC). For example, the offset DAC can be a resistor-based offset DAC, which uses individually selectable resistors (e.g., eight such resistors, one for each bit in the offset current value) of different resistances to generate normalizing currents for each thermal sensor. For instance, the normalizing currents can represent the current that normally flows through the corresponding thermal sensors when not exposed to IR radiation. The offset currents can then be subtracted from the actual sensed currents during biasing of the thermal sensors, and the resulting normalized currents integrated and amplified (e.g., through corresponding charge amplifiers) to produce the analog signals corresponding to the IR flux sensed by the pixels.

The offset currents can be generated, for example, in the column driver area using the offset DACs, such as one offset DAC per column driver. The offset current values (or offset DAC values) can be loaded (e.g., concurrently or simultaneously loaded for the next set of rows to be biased) one cycle before the offset currents are generated, so that the offset DAC values are ready (e.g., to drive the offset DACs) the following cycle when the thermal sensors are pulse biased and measured. The column drivers 130 can thus concurrently or simultaneously measure the thermal sensors while compensating for undesired components in the measured analog signals to generate normalized signals during the biasing and measuring cycle.

In the following cycle, the measured and normalized analog signals can be converted to digital signals through conversion circuitry 140 that includes, for example, preamplifiers and analog-to-digital converters (ADCs). As it can take a significant amount of time (such as 15 ms or more) to produce an accurate digital version (such as a 14-bit version) of an analog signal, in some embodiments, the conversion circuitry is replicated for each thermal sensor being concurrently or simultaneously measured (e.g., one ADC per column per row being concurrently or simultaneously biased).

In the following cycle, the digital IR signals can be output from the ROIC through output circuitry 150. For example, in some embodiments, the digital signals are multiplexed (or MUXed) through a set of serial channels, such as four or more low-voltage differential signaling (LVDS) channels. In some embodiments, depending on the size and number of digital IR signals generated per second, an appropriate number of LVDS channels are provided to offload the digital signals as fast as they are generated.

In order for the 3-way or 4-way (or higher n-way) concurrent or simultaneous biasing to work effectively or efficiently, the thermal sensors should be designed with several considerations in mind. For instance, to drive thermal sensors at frame rates of, for example, 500 Hz or 1000 Hz, the time between measuring any particular pixel for consecutive frames is quite small, such as one or two ms. Accordingly, the time constant for the thermal sensors should be at least this small, to allow for the thermal sensors to return to their pre-bias (e.g., stead state) temperatures. The thermal time constant is a function of the thermal capacitance of each sensor (e.g., size or bulk of the sensor together with its heat capacity) divided by the thermal conductance between the sensor and the ROIC. The thermal time constant should scale (e.g., linearly) with any increase in frame rate, to keep the IR sensing and the IR imaging consistent across frame rates (albeit with decreased sensitivity for the higher frame rates).

In further detail, decreasing the thermal time constant usually coincides with a reduction in response (or signal), which can cause a reduction in the signal-to-noise ratio (SNR) or sensitivity, making the noise a larger component. For example, increasing the thermal capacitance increases the response (and the SNR), but also increases the thermal time constant. Likewise, decreasing the thermal conductance increases the response (and SNR), but also raises the thermal time constant. Other factors that increase response include increasing the pixel TCR and increasing the bias voltage for the concurrent or simultaneous pulse biasing. For example, increasing the vanadium oxide TCR through various metal doping techniques can increase it to 2.5%/° C. or 3.0%/° C. or more.

In some example embodiments, 12 µm vanadium oxide thermal detectors having a TCR of 3.3%/° C. achieve thermal time constants between one ms and ten ms by using a small mass (e.g., very thin to produce a small thermal capacitance) vanadium oxide sensor area and varying the thermal conductance by adjusting the length and width of the connecting metal from the electrodes to the vanadium oxide sensors. Since the resistance (and by extension, the thermal conductance) varies directly with the length and width of the connecting metal (e.g., long and narrow connectors have much higher resistance and lower thermal conductance than short and wide connectors of the same material), increasing the resistance suffices to change the thermal time constant from one ms to ten ms or any value in between.

Figure 2:
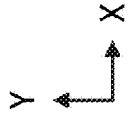
FIG. 2 is a plan view of an example thermal sensor array of the FPA of FIG. 1, according to an embodiment of the present disclosure.

FIG. 2 is a plan (X-Y) view of an example thermal sensor array 200 of the FPA 100 of FIG. 1, according to an embodiment of the present disclosure. FIG. 2 illustrates the interleaving for an example 3-way interleaved subarray arrangement, with every third row being part of the same subarray. Thus, if the thermal sensor array 200 is arranged in a 320×240 configuration, then each of the subarrays is 320×80 and their rows are interleaved through the array 200. Processing of the thermal sensor array 200 can include concurrently or simultaneously pulse biasing and measuring row 1 of each subarray for one cycle, then concurrently or simultaneously pulse biasing and measuring row 2 of each subarray for the next cycle, and so on. After 80 such concurrent or simultaneous pulse biasings, every thermal sensor in the array 200 has been biased (one frame), and the process can be repeated for successive frames. By interleaving the rows and biasing in this fashion, nearby rows are biased and measured at about the same time during the frame processing, which reduces or minimizes artifact effects in the processed images.

It should be noted that interleaving does not have to be strictly row by row. For example, in some embodiments, odd rows are biased one cycle, and the corresponding even rows biased the next cycle. This can reduce or prevent, for instance, sensing abnormalities when consecutive rows are biased and measured in the same cycle. In this case, rows can be interleaved in pairs of consecutive rows (one even, one odd). Using the above four-way example configuration, rows 1, 2, 9, 10, 17, 18, . . . , can be part of one subarray, rows 3, 4, 11, 12, 19, 20, . . . , can be part of a second subarray, rows 5, 6, 13, 14, 21, 22, . . . , can be part of a third subarray, and rows 7, 8, 15, 16, 23, 24, . . . , can be part of a fourth subarray. Accordingly, rows 1, 3, 5, and 7 can be concurrently or simultaneously pulse biased one cycle, rows 2, 4, 6, and 8 concurrently or simultaneously pulse biased the next cycle, rows 9, 11, 13, and 15 concurrently or simultaneously pulse biased the following cycle, and so on.

FIG. 3 is a timeline diagram of an example signal processing pipeline 300 of the FPA 100 of FIG. 1, according to an embodiment of the present disclosure. FIG. 3 illustrates seven different groups of rows (the groups numbered 7, 8, 9, 10, 11, 12, and 13) being concurrently processed over a four cycle (or four bias cycle) window, whose time periods are identified as N, N+1, N+2, and N+3. There are four different operations in the pipeline 300, namely load offset DAC latches, signal integration, A/D conversion, and output data MUX. Using row group 10 as an example, during load offset DAC latches (time N for group 10), the offset DAC values for the next set of rows to be biased and measured are loaded (such as for driving offset DACs) and their values latched for use the following cycle (time N+1). During signal integration (time N+1), the multiple rows of group 10 are concurrently or simultaneously biased and their corresponding currents integrated and measured while being normalized by offset currents generated from the loaded offset DAC values (using the offset DACs). During A/D conversion (time N+2), ADCs are used to concurrently or simultaneously convert the normalized analog signals to corresponding digital signals. During output data MUX (time N+3), the digital signals for group 10 are output through the output channels. Row group 9 follows a similar time line to group 10, only one cycle before group 10, while group 11 is one cycle after group 10.

Figure 4:
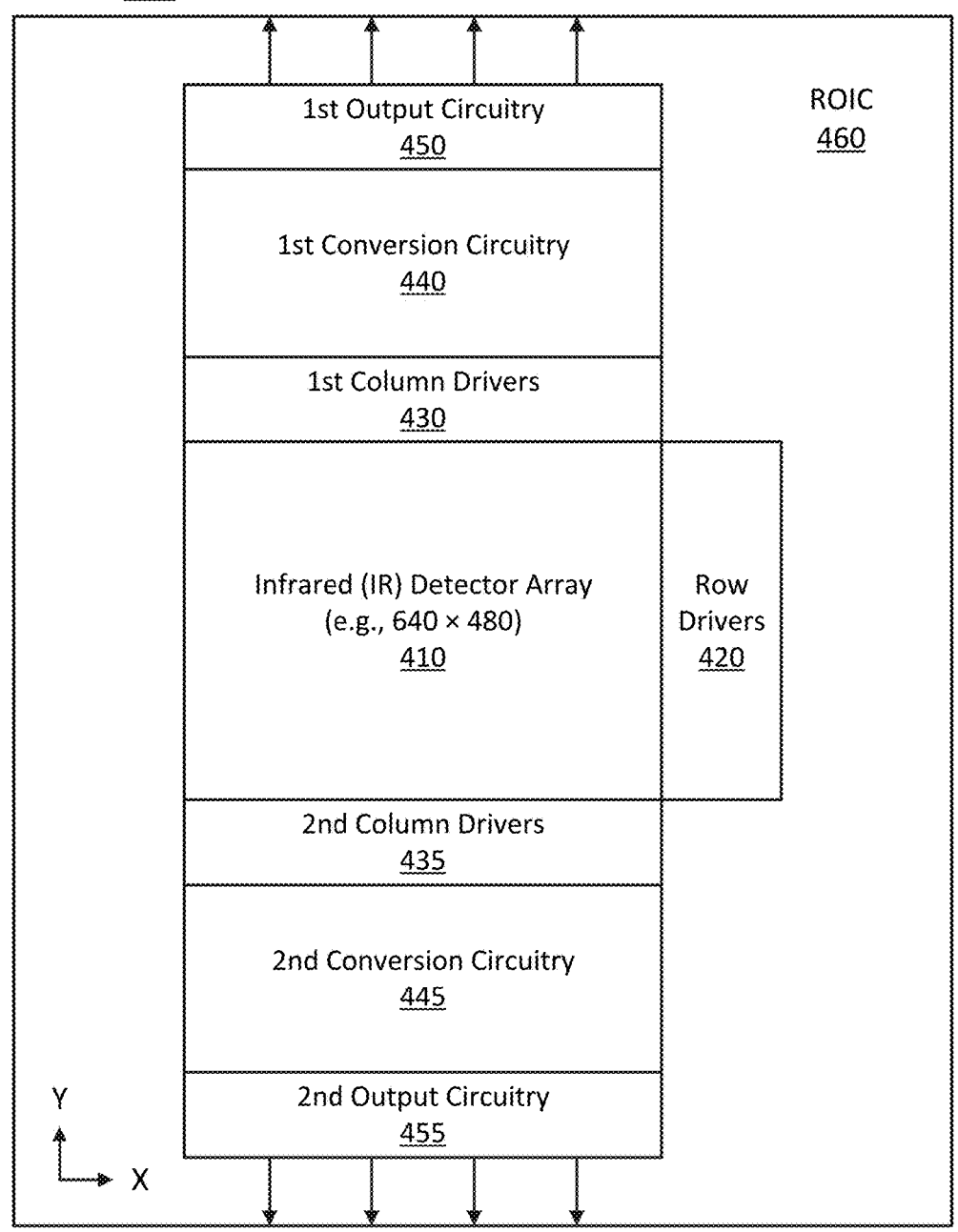
FIG. 4 is a plan view an example thermal imager, according to an embodiment of the present disclosure.

FIG. 4 is a plan (X-Y) view an example thermal imager 400, according to an embodiment of the present disclosure. The thermal imager 400 is similar in many respects to the FPA 100 of FIG. 1. Accordingly, the description will focus on the differences between the two devices, and description of similarly named components may not be repeated.

The thermal imager 400 includes a ROIC 460 and an IR detector array 410 connected to the ROIC 460. The IR detector array 410 is driven by row drivers 420, first column drivers 430, and second column drivers 435. The IR detector array 410 is, for example, 640×480. As with the FPA 100 of FIG. 1, the thermal imager 400 of FIG. 4 is illustrated as a three- or four-way system, capable of concurrently or simultaneously pulse biasing three or four rows at a time. However, unlike the extra width occupied by the column-related components (e.g., column drivers 130 and conversion circuitry 140) of the FPA 100, the thermal imager 400 employs a combination of stacking and double-siding. For example, the double-siding can include dividing the column drivers into the first column drivers 430 on a first side of the array 410 and the second column drivers 435 on a second side of the array 410 opposite the first side, dividing the conversion circuitry into first conversion circuitry 440 on the first side and second conversion circuitry 445 on the second side, and dividing the output circuitry into first output circuitry 450 on the first side and second output circuitry 455 on the second side.

The double-siding can be by row or subarray or both. For example, the IR detector array 410 can be designed as a four-way imager capable of concurrently or simultaneously pulse biasing four rows in the same cycle. The stacked column components thus allow two of the rows to be processed on the first side and the other two rows to be processed on the second side. For instance, the first side can process the odd rows while the second side processes the even rows. A three-way device is possible, for example, by processing two of the rows on one side (e.g., with stacked column components) and while processing another row on the other side (e.g., with unstacked column components).

Figure 5:
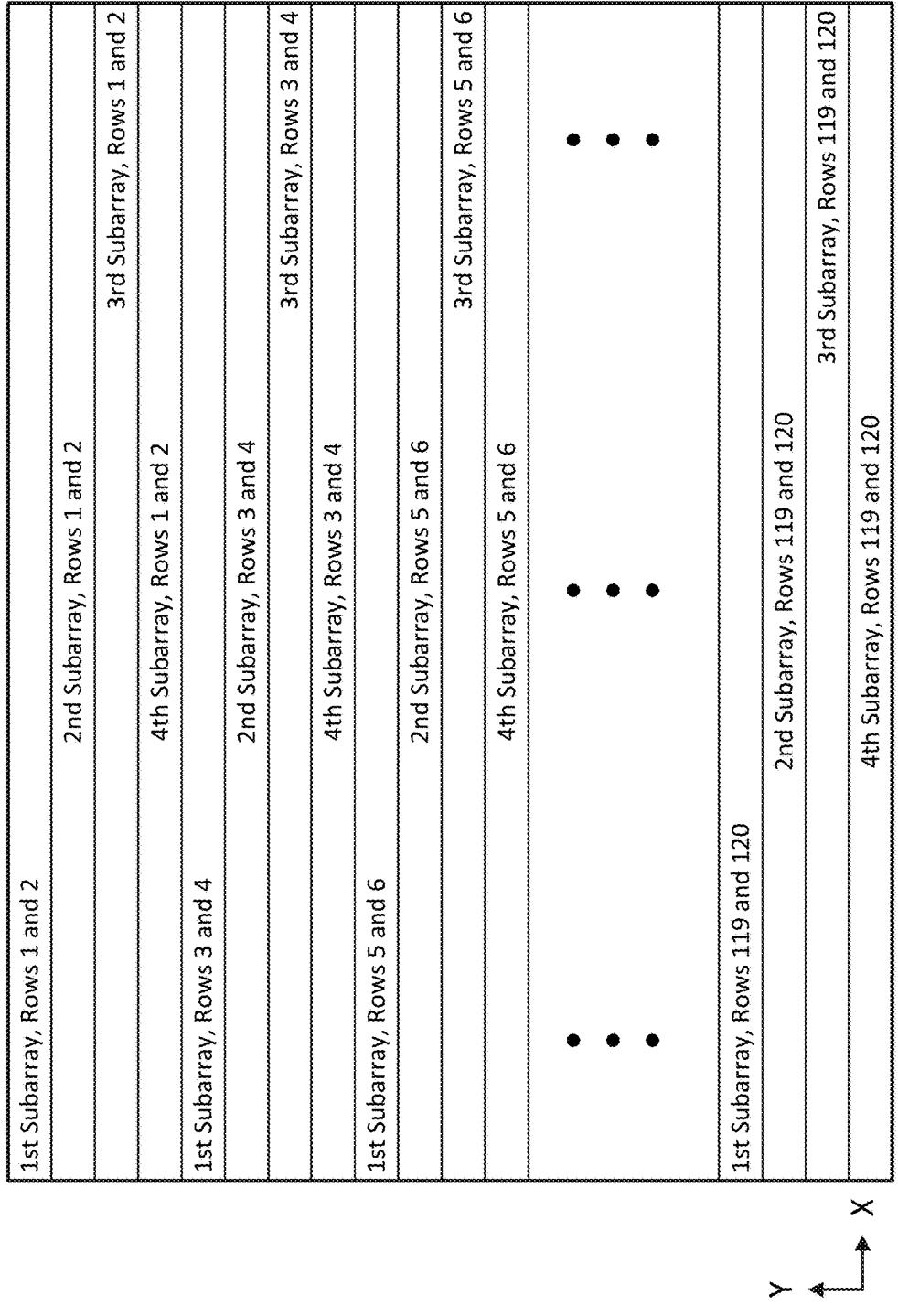
FIG. 5 is a plan view of an example infrared (IR) detector array of the thermal imager of FIG. 4, according to an embodiment of the present disclosure.

FIG. 5 is a plan (X-Y) view of an example infrared (IR) detector array 500 of the thermal imager 400 of FIG. 4, according to an embodiment of the present disclosure. The subarray arrangement of the IR detector array 500 differs from that of the thermal sensor array 200 of FIG. 2. For example, while both arrangements feature interleaved rows between the different subarrays, the IR detector array 500 interleaves the rows two at a time, so that groups of eight rows include two consecutive rows (an odd row and an adjacent even row) for each of the four subarrays. This allows, for example, odd rows to be processed one cycle and even rows the next cycle, which prevents concurrent or simultaneous biasing or other processing of adjacent rows. The interleaving of the IR detector array 500 is just an example. In other embodiments, the rows can be interleaved, for example, one at a time (e.g., alternating among the four subarrays with each row), four at a time (e.g., in groups of four consecutive rows, each group assigned to one subarray, with the groups alternating among the four subarrays), or other such arrangements.

Figure 6:
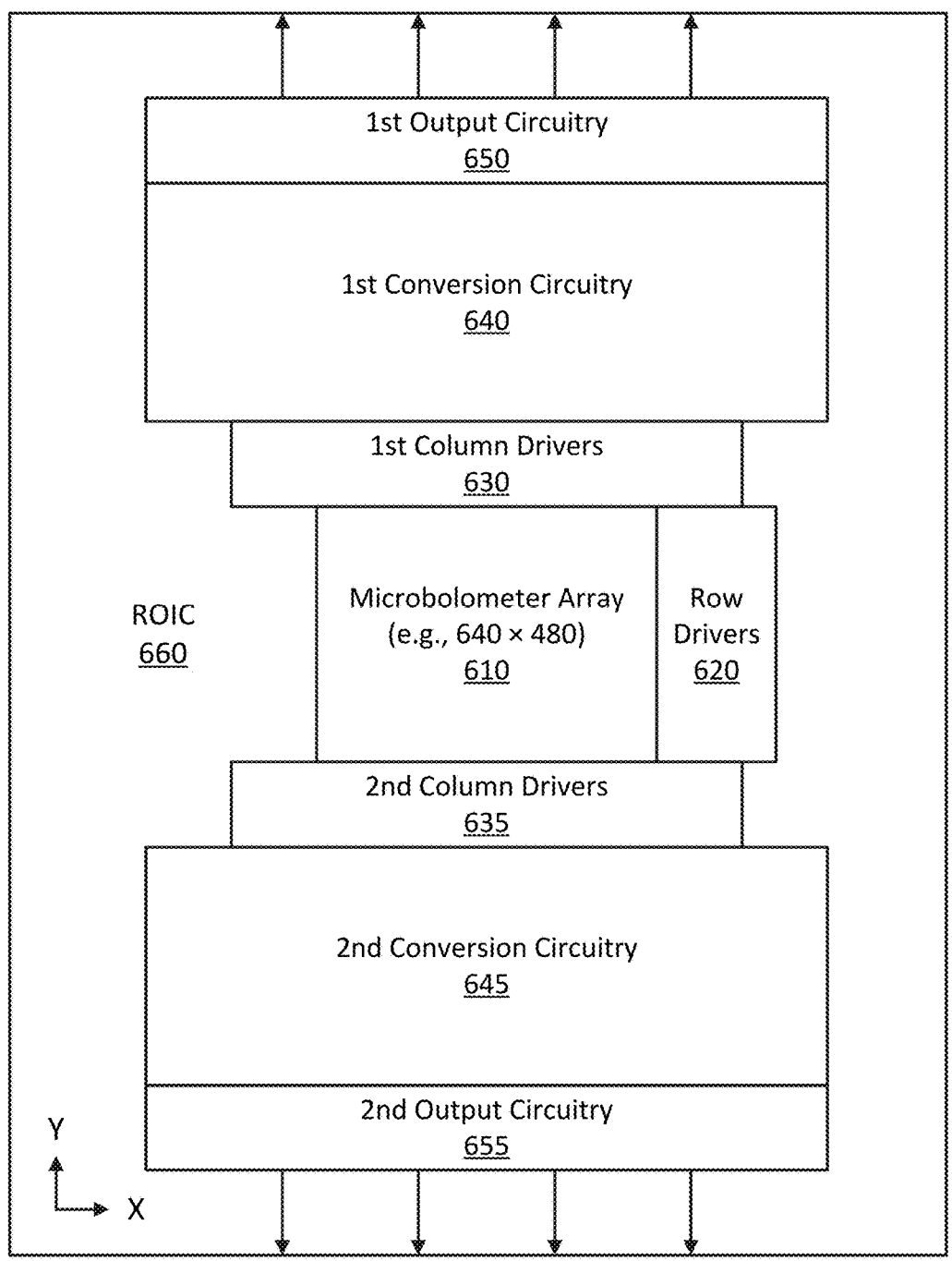
FIG. 6 is a plan view an example IR imaging integrated circuit (IC), according to an embodiment of the present disclosure.

FIG. 6 is a plan (X-Y) view an example IR imaging integrated circuit (IC) 600, according to an embodiment of the present disclosure. The IR imaging IC 600 is similar in many respects to the thermal imager 400 of FIG. 4. Accordingly, the description will focus on the differences between the two devices, and description of similarly named components may not be repeated.

The IR imaging IC 600 includes a ROIC 660 and a microbolometer array 610 connected to the ROIC 660. The array 610 is driven by row drivers 620, first column drivers 630, and second column drivers 635, together with first conversion circuitry 640, second conversion circuitry 645, first output circuitry 650, and second output circuitry 655. The microbolometer array 610 is, for example, 640×480. Unlike the thermal imager 400 of FIG. 4, the IR imaging IC 600 of FIG. 6 is illustrated as a six- or eight-way system, capable of concurrently or simultaneously pulse biasing six or eight rows at a time. As such, the IR imaging IC employs all three earlier described and illustrated techniques to house the extra column circuitry needed to concurrently or simultaneously process six or eight rows per cycle, namely the extra width (side-by-side), stacking, and double-sided column components. For six-way stacking, for example, four of the sets of column components can be located on one side (e.g., side-by-side and stacked) while the other two sets of column components are on the other side (e.g., side-by-side, but unstacked).

Figure 7:
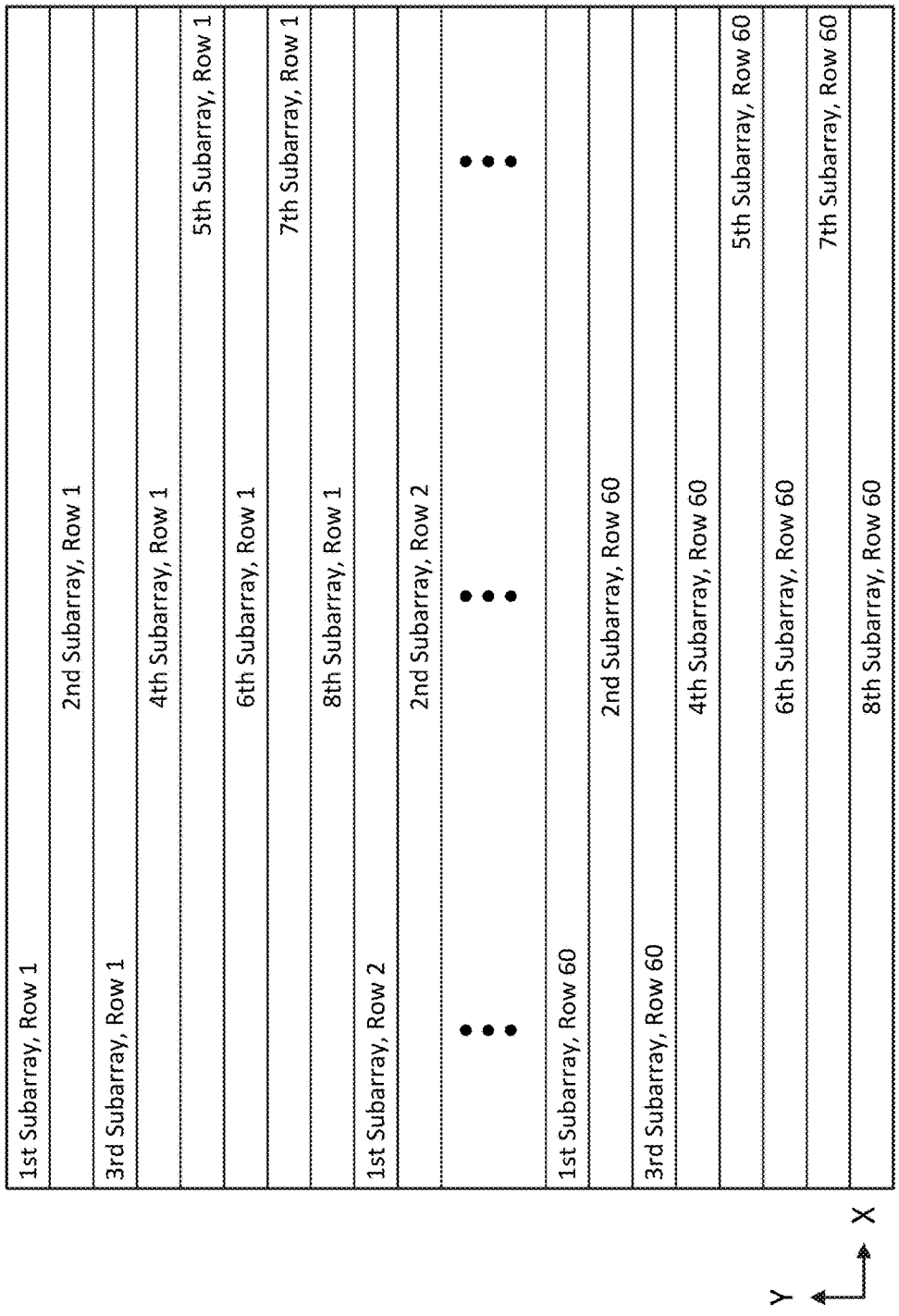
FIG. 7 is a plan view of an example microbolometer array of the IR imaging IC of FIG. 6, according to an embodiment of the present disclosure.

FIG. 7 is a plan (X-Y) view of an example microbolometer array 700 of the IR imaging IC 600 of FIG. 6, according to an embodiment of the present disclosure. The array 700 is eight-way interleaved, one row at a time, alternating among the eight subarrays. Thus, the first eight rows have row 1 of each subarray, the next eight rows have row 2 of each subarray, and so on.

Figure 8:
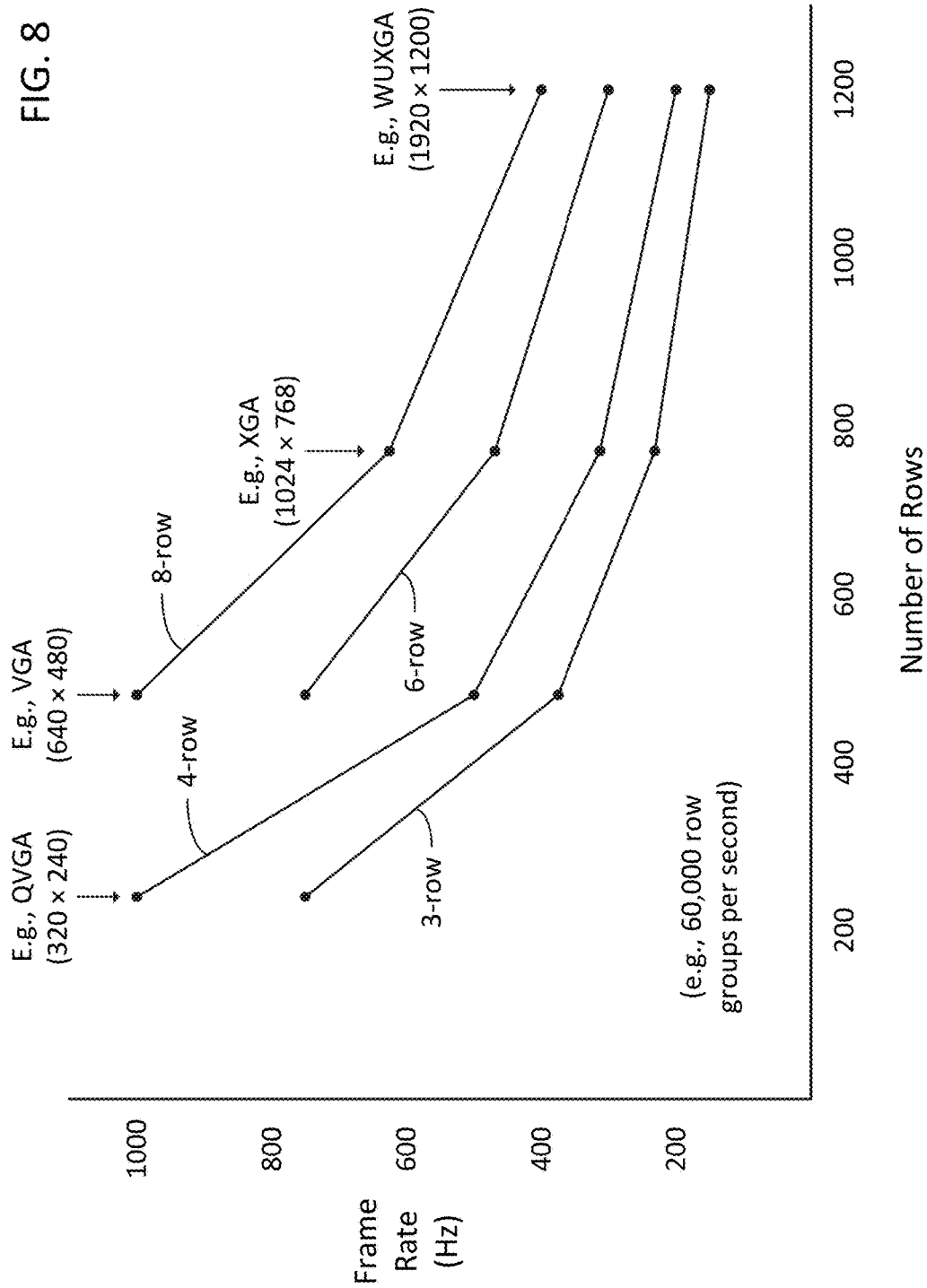
FIGS. 8-9 are graphical depictions of example performances of thermal imaging devices, according to various embodiments of the present disclosure.
Figure 9:
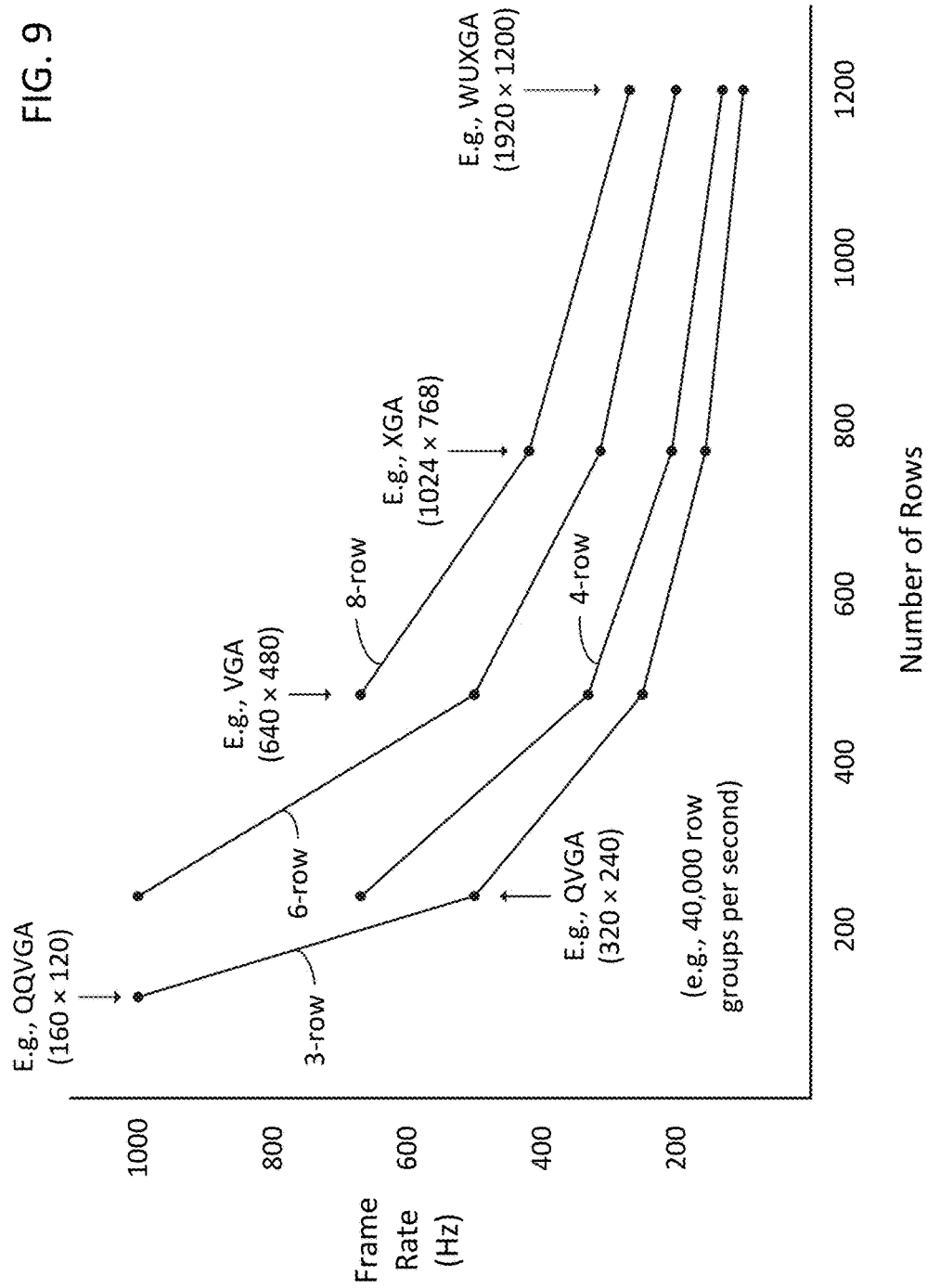

FIGS. 8-9 are graphical depictions of example performances of thermal imaging devices, according to various embodiments of the present disclosure. These are only intended as example configurations and corresponding frame rates, with some example video resolution architectures (e.g., QQVGA or 160×120, QVGA or 320×240, VGA or 640×480, XGA or 1024×768, and WUXGA or 1920× 1200) highlighted and lines connecting the same n-way (3-row, 4-row, 6-row, or 8-row, depending on how many rows are concurrently or simultaneously pulse biased) configurations to provide approximate values for architectures in between these examples.

In FIGS. 8-9, the x-axis represents the number of rows in the configuration, while the y-axis represents the frame rate (in Hz) corresponding to the number of rows. The frame rate changes with the amount of concurrent or simultaneous row processing (n-way). The data points in FIG. 8 represent embodiments being processed at 60,000 row groups per second (where each row group has as many rows as the n-way indicates), while the data points in FIG. 9 represent embodiments being processed at 40,000 row groups per second. Corresponding frame rates of the illustrated embodiments are between 100 Hz and 1000 Hz.

Numerous other embodiments and system configurations will be apparent in light of this disclosure.

Methodology

FIG. 10 is a flow diagram of an example method 1000 of thermal imaging, according to an embodiment of the present disclosure. The method 1000 may be performed, for example, by the thermal imaging devices of FIGS. 1-7. More generally, the method 1000 and other methods described herein may be implemented in hardware or combinations of hardware and software. For example, the method 1000 may be implemented by the components and techniques illustrated in FIGS. 1-9. Throughout the description of the method 1000, references may be made to corresponding components of the FPA 100 of FIG. 1, the thermal imager 400 of FIG. 4, and the IR imaging IC of FIG. 6. In some other embodiments, the method 1000 may be implemented by a custom circuit such as an FPA including an integrated ROIC with custom processing circuits configured to carry out the method 1000. In other embodiments, parts of the method 1000 may be performed in conjunction with a special purpose processor, such as a signal processor. In addition, while the methods described herein may appear to have a certain order to their operations, other embodiments may not be so limited. Accordingly, the order of the operations can be varied between embodiments, as would be apparent in light of this disclosure.

Referring to the method 1000 of FIG. 10, processing begins with dividing 1010 image processing of an array of infrared detectors (such as thermal sensor array 110, IR detector array 410, or microbolometer array 610) arranged in at least 240 rows and at least 320 columns into concurrent or simultaneous image processing of four or more subarrays (such as IR detector array 500) of the infrared detectors that together make up the array. The concurrent or simultaneous image processing can include not cooling the infrared detectors during the thermal imaging. The dividing of the image processing can include interleaving the rows of one of the subarrays with the rows of another one or more of the subarrays (e.g., as shown in FIGS. 2. 5, and 7).

The method 1000 further includes concurrently or simultaneously loading 1020 offset current values (e.g., with column drivers 130) for the infrared detectors of one of the rows of each of the subarrays as part of the concurrent or simultaneous image processing. The offset current values (e.g., offset DAC values) are used to generate offset currents (e.g., with offset DACs) that are used to normalize analog infrared signals (e.g., currents) from biased infrared detectors of the one of the rows of each of the subarrays to corresponding normalized signals. In some embodiments, the loading 1020 of the offset current values is part of a first cycle (or first bias cycle) of a pipelined process for thermal imaging.

The method 1000 further includes concurrently or simultaneously pulse biasing 1030 the infrared detectors (e.g., with row drivers 120) of the one of the rows of each of the subarrays to generate the analog infrared signals while concurrently or simultaneously generating the offset currents from the loaded offset current values to normalize the analog infrared signals (e.g., using column drivers 130) into corresponding normalized signals. In some embodiments, the concurrent or simultaneous pulse biasing 1030 of the infrared detectors (and normalizing of the generated analog infrared signals) is part of a second cycle (or second bias cycle) of the pipelined process for thermal imaging, and takes place while concurrently or simultaneously loading the offset current values for the infrared detectors of a subsequent row (such as a later row) of each of the subarrays.

The method 1000 further includes concurrently or simultaneously converting 1040 the normalized signals (e.g., with conversion circuitry 140) of the one row of each of the subarrays to corresponding digital signals. In some embodiments, the concurrent or simultaneous converting 1040 of the normalized signals is part of a third cycle (or third bias cycle) of the pipelined process for thermal imaging, and takes place while concurrently or simultaneously pulse biasing the infrared detectors of the subsequent row of each of the subarrays. The method 1000 further includes sequentially biasing 1050 the rows of each of the subarrays at a rate of at least 40,000 rows per second.

Numerous other techniques and methods will be apparent in light of this disclosure.

Further Example Embodiments

The following examples pertain to further embodiments, from which numerous permutations and configurations will be apparent.

Example 1 is a focal-plane array (FPA) including: an array of thermal sensors arranged in at least 120 rows and at least 160 columns, the thermal sensors being divided among three or more subarrays; and bias circuitry to simultaneously pulse bias the thermal sensors of one of the rows of each of the subarrays, and to sequentially bias the rows of each of the subarrays at a rate of at least 40,000 rows per second.

Example 2 includes the FPA of Example 1, wherein the at least 120 rows include at least 240 rows, the at least 160 columns include at least 320 columns, the three or more subarrays include four or more subarrays, the bias circuitry is further configured to sequentially bias the rows of each of the four or more subarrays at a rate of at least 45,000 rows per second, and the rows of each of the four or more subarrays are interleaved with the rows of the other of the four or more subarrays.

Example 3 includes the FPA of Example 1, wherein the thermal sensors are configured to be operated without cooling.

Example 4 includes the FPA of Example 1, further including conversion circuitry to simultaneously convert analog thermal signals from the biased thermal sensors of the one of the rows of each of the subarrays to corresponding digital thermal signals while the bias circuitry simultaneously pulse biases the thermal sensors of a subsequent one of the rows of each of the subarrays.

Example 5 includes the FPA of Example 4, further including offset circuitry to simultaneously load offset current values for each of the thermal sensors of the one of the rows of each of the subarrays while the bias circuitry simultaneously pulse biases the thermal sensors of a previous one of the rows of each of the subarrays, and to simultaneously generate offset currents from the loaded offset current values to normalize the analog thermal signals to corresponding normalized thermal signals while the bias circuitry simultaneously pulse biases the thermal sensors of the one of the rows of each of the subarrays, wherein the conversion circuitry is further configured to convert the normalized thermal signals to the corresponding digital thermal signals.

Example 6 includes the FPA of Example 4, wherein the conversion circuitry is divided into first conversion circuitry in a first peripheral area of the array and second conversion circuitry in a second peripheral area of the array opposite the first peripheral area, the at least 120 rows are divided into a first group of rows electrically connected to the first conversion circuitry and a second group of rows electrically connected to the second conversion circuitry, the three or more subarrays are divided into a first group of subarrays whose rows are the first group of rows and a second group of subarrays whose rows are the second group of rows, and the first conversion circuitry is configured to convert the analog thermal signals for the first group of subarrays while the second conversion circuitry converts the analog thermal signals for the second group of subarrays.

Example 7 includes the FPA of Example 6, wherein the at least 120 rows include at least 480 rows, the at least 160 columns include at least 640 columns, the three or more subarrays include four or more subarrays, and the bias circuitry is further configured to sequentially bias the rows of each of the four or more subarrays at a rate of at least 45,000 rows per second.

Example 8 includes the FPA of Example 7, wherein the at least 480 rows include at least 768 rows, the at least 640 columns include at least 1024 columns, the four or more subarrays include six or more subarrays, and the bias circuitry is further configured to sequentially bias the rows of each of the six or more subarrays at a rate of at least 50,000 rows per second.

Example 9 includes the FPA of Example 8, wherein the at least 768 rows include at least 1200 rows, the at least 1024 columns include at least 1920 columns, the six or more subarrays include eight or more subarrays, and the bias circuitry is further configured to sequentially bias the rows of each of the eight or more subarrays at a rate of at least 60,000 rows per second.

Example 10 is a method of thermal imaging, the method including dividing image processing of an array of infrared detectors arranged in at least 240 rows and at least 320 columns into simultaneous image processing of four or more subarrays of the infrared detectors that together make up the array, wherein the simultaneous image processing includes: simultaneously pulse biasing the infrared detectors of one of the rows of each of the subarrays; and sequentially biasing the rows of each of the subarrays at a rate of at least 40,000 rows per second.

Example 11 includes the method of Example 10, wherein the dividing of the image processing includes interleaving the rows of one of the subarrays with the rows of another one or more of the subarrays.

Example 12 includes the method of Example 10, wherein the simultaneous image processing includes not cooling the infrared detectors during the thermal imaging.

Example 13 includes the method of Example 10, wherein the simultaneous image processing further includes simultaneously converting analog infrared signals from the biased infrared detectors of the one of the rows of each of the subarrays to corresponding digital infrared signals while simultaneously pulse biasing the infrared detectors of another one of the rows of each of the subarrays.

Example 14 includes the method of Example 10, wherein the simultaneous image processing further includes: simultaneously loading offset current values for each of the infrared detectors of the one of the rows of each of the subarrays while simultaneously pulse biasing the infrared detectors of a previous one of the rows of each of the subarrays; and simultaneously generating offset currents from the loaded offset current values to normalize analog thermal signals from the biased infrared detectors of the one of the rows of each of the subarrays to corresponding normalized signals while simultaneously pulse biasing the infrared detectors of the one of the rows of each of the subarrays.

Example 15 is a readout integrated circuit (ROIC) including: a sensing area to physically and electrically connect to an array of bolometers arranged in at least 240 rows and at least 320 columns, the bolometers being divided among four or more subarrays, the sensing area including row circuitry to simultaneously pulse bias the bolometers of one of the rows of each of the subarrays, and to sequentially bias the rows of each of the subarrays at a rate of at least 40,000 rows per second, and column circuitry to simultaneously measure analog signals from the pulse biased bolometers; and conversion circuitry to convert the measured analog signals to corresponding digital signals.

Example 16 includes the ROIC of Example 15, further including offset circuitry to load offset current values for each of the bolometers of the one of the rows of each of the subarrays, and to generate offset currents from the loaded offset current values to normalize the analog signals to corresponding normalized signals, wherein the conversion circuitry is further configured to convert the normalized signals to the corresponding digital signals.

Example 17 includes the ROIC of Example 16, wherein the row circuitry is further configured to simultaneously pulse bias the bolometers of the one of the rows of each of the subarrays while offset circuitry simultaneously generates the offset currents of the one of the rows of each of the subarrays, the offset circuitry simultaneously loads the offset current values of a subsequent one of the rows of each of the subarrays, and the conversion circuitry simultaneously converts the corresponding normalized signals of a previous one of the rows of each of the subarrays.

Example 18 includes the ROIC of Example 15, wherein the conversion circuitry is divided into first conversion circuitry on a first side of the sensing area and second conversion circuitry on a second side of the sensing area opposite the first side, the at least 240 rows are divided into a first group of rows electrically connected to the first conversion circuitry and a second group of rows electrically connected to the second conversion circuitry, the four or more subarrays are divided into a first group of subarrays whose rows are the first group of rows and a second group of subarrays whose rows are the second group of rows, the column circuitry includes first column circuitry to simultaneously measure the analog signals of the first group of subarrays at the first side of the sensing area and second column circuitry to simultaneously measure the analog signals of the second group of subarrays at the second side of the sensing area, and the first conversion circuitry is configured to convert the measured analog signals of the first group of subarrays while the second conversion circuitry converts the measured analog signals of the second group of subarrays Example 19 includes the ROIC of Example 18, wherein the rows of the first group of subarrays are interleaved with the rows of the second group of subarrays.

Example 20 includes the ROIC of Example 18, wherein the at least 240 rows include at least 480 rows, the at least 320 columns include at least 640 columns, the four or more subarrays include eight or more subarrays, and the row circuitry is further configured to sequentially bias the rows of each of the eight or more subarrays at a rate of at least 50,000 rows per second.

Example 21 is a focal-plane array (FPA) including: a two-dimensional configuration of thermal sensors arranged in rows, the rows of thermal sensors being divided into three or more subsets; and bias circuitry to concurrently pulse bias the thermal sensors of one of the rows of each of the subsets, and to sequentially bias the rows of each of the subsets at a rate of at least 40,000 rows per second.

Example 22 includes the FPA of Example 21, wherein the rows include at least 240 rows, the three or more subsets include four or more subsets, the bias circuitry is further configured to sequentially bias the rows of each of the four or more subsets at a rate of at least 45,000 rows per second, and the rows of each of the four or more subsets are interleaved with the rows of the other of the four or more subsets.

Example 23 includes the FPA of Example 21, wherein the thermal sensors are configured to be operated without cooling.

Example 24 includes the FPA of Example 21, further including conversion circuitry to concurrently convert analog thermal signals from the pulse biased thermal sensors of the one of the rows of each of the subsets to corresponding digital thermal signals while the bias circuitry concurrently pulse biases the thermal sensors of a subsequent one of the rows of each of the sub sets.

Example 25 includes the FPA of Example 24, further including offset circuitry to concurrently load offset current values for each of the thermal sensors of the one of the rows of each of the subsets while the bias circuitry concurrently pulse biases the thermal sensors of a previous one of the rows of each of the subsets, and to concurrently generate offset currents from the loaded offset current values to normalize the analog thermal signals to corresponding normalized thermal signals while the bias circuitry concurrently pulse biases the thermal sensors of the one of the rows of each of the subsets, wherein the conversion circuitry is further configured to convert the normalized thermal signals to the corresponding digital thermal signals.

Example 26 includes the FPA of Example 24, wherein the conversion circuitry is divided into first conversion circuitry in a first peripheral area of the array and second conversion circuitry in a second peripheral area of the array opposite the first peripheral area, the rows are divided into first rows electrically connected to the first conversion circuitry and second rows electrically connected to the second conversion circuitry, the three or more subsets are divided into a first group of subsets whose rows are the first rows and a second group of subsets whose rows are the second rows, and the first conversion circuitry is configured to convert the analog thermal signals for the first group of subsets while the second conversion circuitry converts the analog thermal signals for the second group of subsets.

Example 27 includes the FPA of Example 26, wherein the rows include at least 480 rows, the three or more subsets include four or more subsets, and the bias circuitry is further configured to sequentially bias the rows of each of the four or more subsets at a rate of at least 45,000 rows per second.

Example 28 includes the FPA of Example 27, wherein the at least 480 rows include at least 768 rows, the four or more subsets include six or more subsets, and the bias circuitry is further configured to sequentially bias the rows of each of the six or more subsets at a rate of at least 50,000 rows per second.

Example 29 includes the FPA of Example 28, wherein the at least 768 rows include at least 1200 rows, the six or more subsets include eight or more subsets, and the bias circuitry is further configured to sequentially bias the rows of each of the eight or more subsets at a rate of at least 60,000 rows per second.

Example 30 is a thermal imaging device including: a lens to focus incoming infrared (IR) radiation; and the FPA of Example 21, wherein the bias circuitry is further configured to pulse bias the thermal sensors while the IR radiation is focused on the thermal sensors.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A focal-plane array (FPA) comprising:
   a two-dimensional configuration of thermal sensors arranged in rows, the rows of thermal sensors being divided into three or more subsets; and
   bias circuitry to concurrently pulse bias the thermal sensors of one of the rows of each of the subsets, and to sequentially bias the rows of each of the subsets at a rate of at least 40,000 rows per second.

2. The FPA of claim 1, wherein
   the rows comprise at least 240 rows,
   the three or more subsets comprise four or more subsets,
   the bias circuitry is further configured to sequentially bias the rows of each of the four or more subsets at a rate of at least 45,000 rows per second, and
   the rows of each of the four or more subsets are interleaved with the rows of the other of the four or more subsets.

3. The FPA of claim 1, wherein the thermal sensors are configured to be operated without cooling.

4. The FPA of claim 1, further comprising conversion circuitry to concurrently convert analog thermal signals from the pulse biased thermal sensors of the one of the rows of each of the subsets to corresponding digital thermal signals while the bias circuitry concurrently pulse biases the thermal sensors of a subsequent one of the rows of each of the subsets.

5. The FPA of claim 4, further comprising offset circuitry to concurrently load offset current values for each of the thermal sensors of the one of the rows of each of the subsets while the bias circuitry concurrently pulse biases the thermal sensors of a previous one of the rows of each of the subsets, and to concurrently generate offset currents from the loaded offset current values to normalize the analog thermal signals to corresponding normalized thermal signals while the bias circuitry concurrently pulse biases the thermal sensors of the one of the rows of each of the subsets, wherein the conversion circuitry is further configured to convert the normalized thermal signals to the corresponding digital thermal signals.

6. The FPA of claim 4, wherein
the conversion circuitry is divided into first conversion circuitry in a first peripheral area of the array and second conversion circuitry in a second peripheral area of the array opposite the first peripheral area,
the rows are divided into first rows electrically connected to the first conversion circuitry and second rows electrically connected to the second conversion circuitry,
the three or more subsets are divided into a first group of subsets whose rows are the first rows and a second group of subsets whose rows are the second rows, and
the first conversion circuitry is configured to convert the analog thermal signals for the first group of subsets while the second conversion circuitry converts the analog thermal signals for the second group of subsets.

7. The FPA of claim 6, wherein
the rows comprise at least 480 rows,
the three or more subsets comprise four or more subsets, and
the bias circuitry is further configured to sequentially bias the rows of each of the four or more subsets at a rate of at least 45,000 rows per second.

8. The FPA of claim 7, wherein
the at least 480 rows comprise at least 768 rows,
the four or more subsets comprise six or more subsets, and
the bias circuitry is further configured to sequentially bias the rows of each of the six or more subsets at a rate of at least 50,000 rows per second.

9. The FPA of claim 8, wherein
the at least 768 rows comprise at least 1200 rows,
the six or more subsets comprise eight or more subsets, and
the bias circuitry is further configured to sequentially bias the rows of each of the eight or more subsets at a rate of at least 60,000 rows per second.

10. A thermal imaging device comprising:
a lens to focus incoming infrared (IR) radiation; and
the FPA of claim 1,
wherein the bias circuitry is further configured to pulse bias the thermal sensors while the IR radiation is focused on the thermal sensors.

11. A method of thermal imaging, the method comprising dividing image processing of an array of infrared detectors arranged in at least 240 rows and at least 320 columns into simultaneous image processing of four or more subarrays of the infrared detectors that together make up the array, wherein the simultaneous image processing comprises:
simultaneously pulse biasing the infrared detectors of one of the rows of each of the subarrays; and
sequentially biasing the rows of each of the subarrays at a rate of at least 40,000 rows per second.

12. The method of claim 11, wherein the dividing of the image processing comprises interleaving the rows of one of the subarrays with the rows of another one or more of the subarrays.

13. The method of claim 11, wherein the simultaneous image processing comprises not cooling the infrared detectors during the thermal imaging.

14. The method of claim 11, wherein the simultaneous image processing further comprises simultaneously converting analog infrared signals from the biased infrared detectors of the one of the rows of each of the subarrays to corresponding digital infrared signals while simultaneously pulse biasing the infrared detectors of another one of the rows of each of the subarrays.

15. The method of claim 11, wherein the simultaneous image processing further comprises:
simultaneously loading offset current values for each of the infrared detectors of the one of the rows of each of the subarrays while simultaneously pulse biasing the infrared detectors of a previous one of the rows of each of the subarrays; and
simultaneously generating offset currents from the loaded offset current values to normalize analog thermal signals from the biased infrared detectors of the one of the rows of each of the subarrays to corresponding normalized signals while simultaneously pulse biasing the infrared detectors of the one of the rows of each of the subarrays.

16. A readout integrated circuit (ROIC) comprising:
a sensing area to physically and electrically connect to an array of bolometers arranged in at least 240 rows and at least 320 columns, the bolometers being divided among four or more subarrays, the sensing area including
row circuitry to simultaneously pulse bias the bolometers of one of the rows of each of the subarrays, and to sequentially bias the rows of each of the subarrays at a rate of at least 40,000 rows per second, and
column circuitry to simultaneously measure analog signals from the pulse biased bolometers; and
conversion circuitry to convert the measured analog signals to corresponding digital signals.

17. The ROIC of claim 16, further comprising offset circuitry to load offset current values for each of the bolometers of the one of the rows of each of the subarrays, and to generate offset currents from the loaded offset current values to normalize the analog signals to corresponding normalized signals, wherein the conversion circuitry is further configured to convert the normalized signals to the corresponding digital signals.

18. The ROIC of claim 17, wherein the row circuitry is further configured to simultaneously pulse bias the bolometers of the one of the rows of each of the subarrays while offset circuitry simultaneously generates the offset currents of the one of the rows of each of the subarrays, the offset circuitry simultaneously loads the offset current values of a subsequent one of the rows of each of the subarrays, and the conversion circuitry simultaneously converts the corresponding normalized signals of a previous one of the rows of each of the subarrays.

19. The ROIC of claim 16, wherein
the conversion circuitry is divided into first conversion circuitry on a first side of the sensing area and second conversion circuitry on a second side of the sensing area opposite the first side,
the at least 240 rows are divided into first rows electrically connected to the first conversion circuitry and second rows electrically connected to the second conversion circuitry,
the four or more subarrays are divided into a first group of subarrays whose rows are the first rows and a second group of subarrays whose rows are the second rows,
the column circuitry includes first column circuitry to simultaneously measure the analog signals of the first group of subarrays at the first side of the sensing area and second column circuitry to simultaneously measure the analog signals of the second group of subarrays at the second side of the sensing area, and
the first conversion circuitry is configured to convert the measured analog signals of the first group of subarrays while the second conversion circuitry converts the measured analog signals of the second group of subarrays.

20. The ROIC of claim 19, wherein
the at least 240 rows comprise at least 480 rows,
the at least 320 columns comprise at least 640 columns,
the four or more subarrays comprise eight or more subarrays,
the row circuitry is further configured to sequentially bias the rows of each of the eight or more subarrays at a rate of at least 50,000 rows per second, and
the first rows are interleaved with the second rows.

* * * * *